Figure 1:
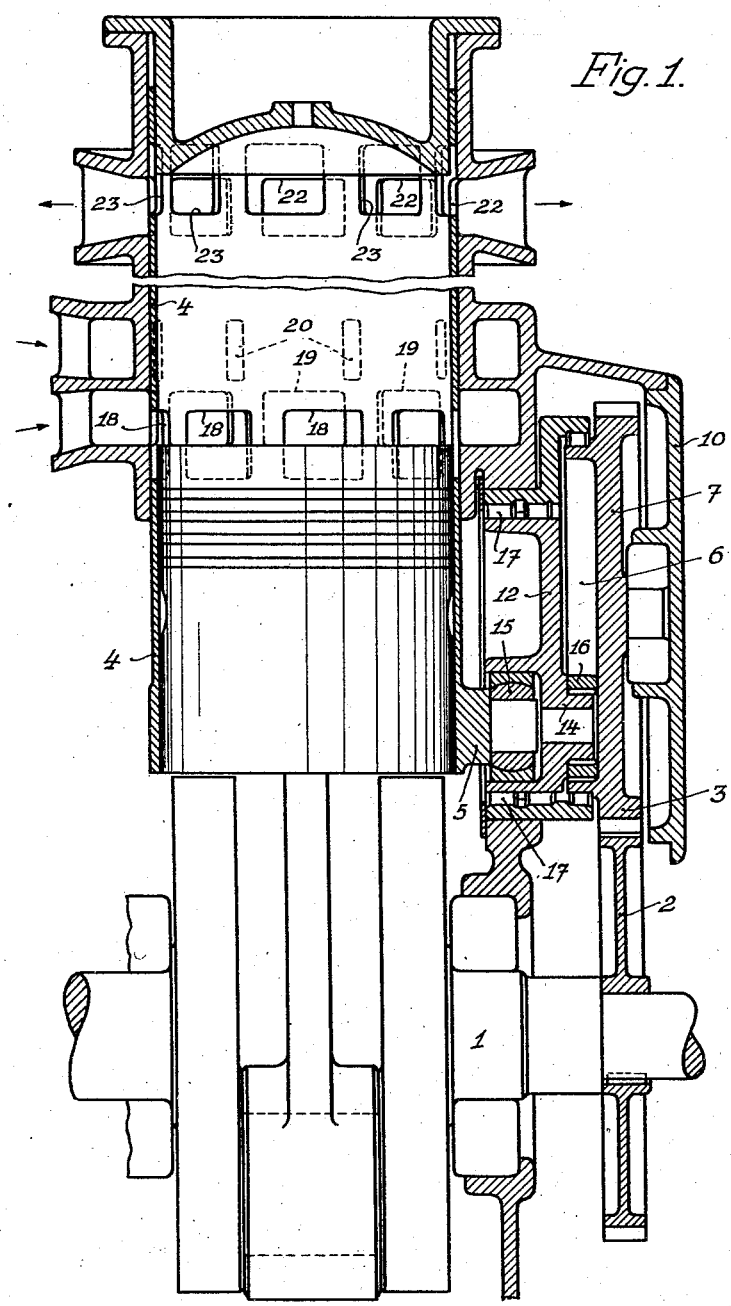

April 16, 1940. G. S. KAMMER 2,197,107
TWO-STROKE CYCLE ENGINE
Filed Feb. 21, 1939 3 Sheets-Sheet 1

Inventor
George S. Kammer
by [signature] Atty.

April 16, 1940.  G. S. KAMMER  2,197,107
TWO-STROKE CYCLE ENGINE
Filed Feb. 21, 1939   3 Sheets-Sheet 2

Inventor
George S. Kammer
By
Atty

April 16, 1940.     G. S. KAMMER     2,197,107
TWO-STROKE CYCLE ENGINE
Filed Feb. 21, 1939     3 Sheets-Sheet 3

Inventor
George S. Kammer
By [signature]
Atty.

Patented Apr. 16, 1940

2,197,107

UNITED STATES PATENT OFFICE 2,197,107

TWO-STROKE CYCLE ENGINE

George Stephen Kammer, Geneva, Switzerland

Application February 21, 1939, Serial No. 257,744
In Germany December 3, 1938

5 Claims. (Cl. 123—65)

The invention relates to engines operating on the two-stroke cycle of the kind in which the control of the exhaust and of the fresh air admission is effected by a single sleeve valve of the Burt-McCollum type, and the control of supercharging is carried out by the oscillation of this valve about the axis of the cylinder.

For effecting the movement of such a valve in the two directions, use was hitherto made of an overhung crank shaft engaging a pin positively connected to the valve, the connection being through a cardan or other flexible joint, so that the valve followed the circular movement described by the crank pin.

With a valve driven in this way, the reciprocatory movement in the same direction as the axis of the cylinder follows the projection of the centre line of the crank pin on the longitudinal axis. Consequently the valve reaches its highest velocity half way between its inner and outer dead centres, a position at which high velocities are not required at all. This maximum velocity, which ensures rapid closing and opening of the control ports and thus provides large port opening for a given angular movement of the crank, ought rather to be displaced to the neighbourhood of the outer dead centre.

Since, moreover, the times of opening are restricted to certain crank angles, it is only possible in this valve gear construction, to utilise a small part of the valve travel as maximum clear aperture for the ports, so that only comparatively slow opening and closing and small time cross-sections can be achieved. If larger transfer cross-sectional areas are to be obtained, the valve travel must be increased, but this is at the expense of larger moments of inertia of the valve, involving a heavier drive, and larger constructional height of the engine.

The object of the invention is to overcome these drawbacks by shifting the maximum velocities of the valve nearer to the outer dead centre. By this means it also becomes possible to control with the desired velocity the supercharging ports separately provided in the cylinder wall.

In the two-cycle sleeve valve engine according to the invention exhaust and scavenge ports are provided in the cylinder wall and in the valve, and separate supercharging ports in the cylinder wall and not in the valve. The exhaust and scavenge ports are controlled by the axial movement of the valve, and the supercharging ports by its rotary movement, the arrangement being that the supercharging ports are opened by the movement of the valve alone, and closed by that of the piston and the valve.

Preferably the scavenge ports remain open after the exhaust ports are closed, and until the cylinder is charged substantially to the pressure of the scavenging air, while the supercharging ports in the cylinder are brought into register with the scavenge ports of the valve after the scavenge ports of the cylinder have been closed, and the supercharging ports are closed by the piston when the cylinder has received its supercharge.

The sleeve valve is driven by being positively linked to a crank pin. The crank carrying this crank pin is freely rotatable and is driven by a second crank, which may have a larger or smaller throw than that of the first. The pin of the first crank, hereinafter referred to as the valve crank, has a sliding shoe journalled on it, which slides in a guide on the second crank, hereinafter referred to as the driving crank. The driving crank is journalled eccentrically to the valve crank.

In this way the crank angles of the driving crank are projected through the sliding shoe on to the crank circle of the valve crank in such a manner, that in the neighbourhood of the outer dead centre of the valve the valve crank has to traverse larger angles than the driving crank, which receives its drive from the uniformly rotating crank shaft of the engine. By varying the eccentricity and the crank circle diameter of the driving crank within the widest limits, it is theoretically possible to utilise as effective port aperture the whole movement practically up to 50 per cent of the valve travel, and to open and close the ports at the most suitable points of time, i. e. angular positions of the main crank.

Figure 2:
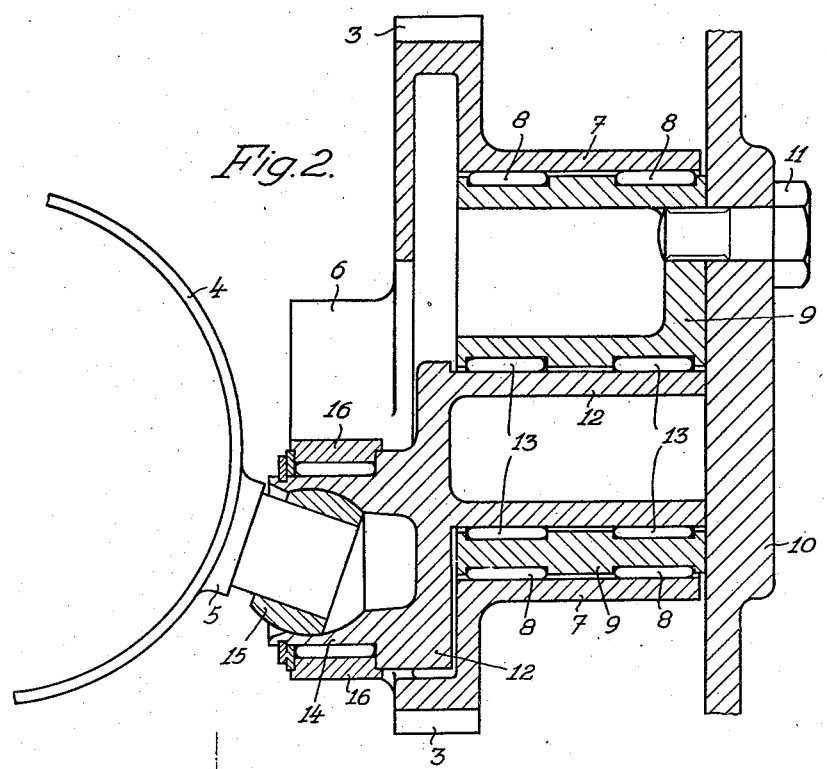
Figure 3:
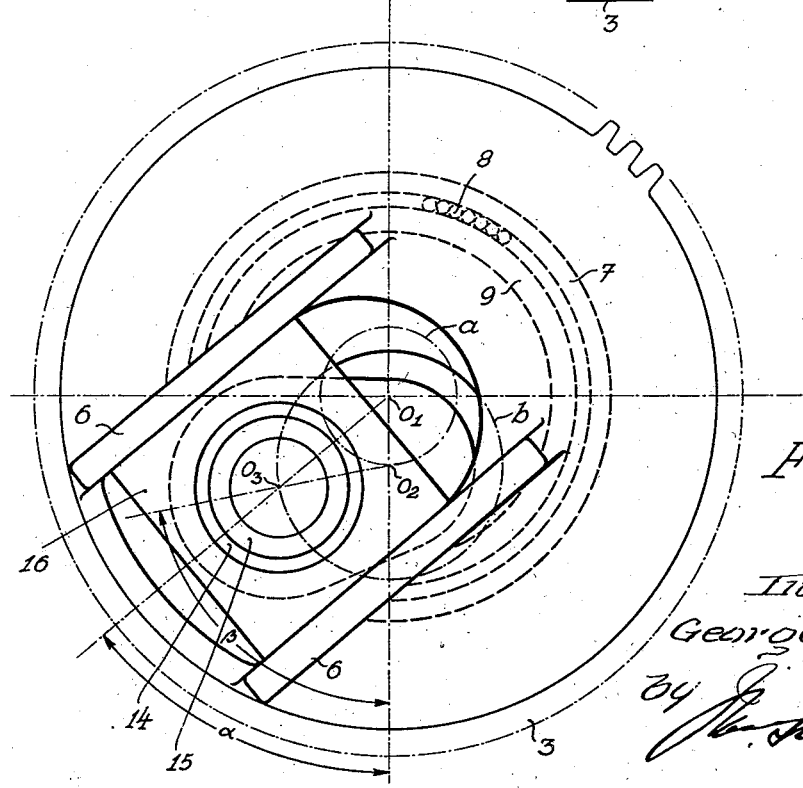
Figure 5:
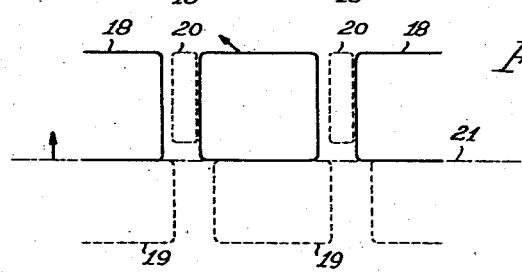
Figure 6:
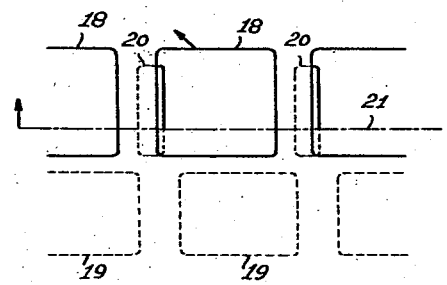
Figure 7:
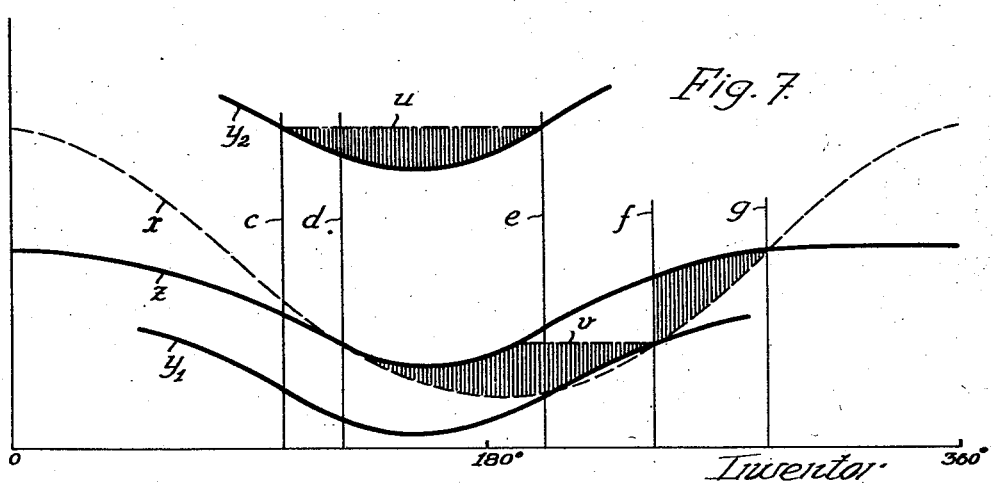

The accompanying drawings illustrate the invention by means of different embodiments and explanatory figures, and therein Figure 1 is a section on the cylinder axis of the relevant parts of an engine according to the present invention, Figure 2 is a section perpendicular to the cylinder axis through another constructional form of valve gear, Figure 3 is an elevation as viewed from the cylinder of the sliding shoe and guide bars of Figure 2, Figures 4 to 6 are diagrams showing the positions of the ports at different parts of the stroke, and Figure 7 is a valve diagram of the engine.

Referring to Figure 1, the main crank shaft 1 has a gear wheel 2 keyed to it, which meshes with a gear wheel 3 to operate the valve gear. What has been termed the driving crank is designated 7, and is mounted on the gear wheel 3. The sleeve valve is designated 4, and is provided with a pin 5, which is connected to the valve crank 12 in such a way that it can rotate. The valve crank is in the form of a disc or sheave running in roller bearings 17 arranged eccentrically to the driving crank 7. The valve crank 12 is rotated by the driving crank 7 in such a way that a sliding shoe 16 pivoted on a projection 14 of the valve crank 12, is caused to slide along guides 6 on the driving crank 7. The position of the driving crank and valve crank shown in the drawing, corresponds to the outer dead centre of the valve. Scavenge ports 19 and supercharging ports 20 are provided in the cylinder wall at the lower end of the cylinder space, and exhaust ports 22 at the upper end of said space. Ports 18 and 23 provided in the sleeve valve 4, serve to control the lower and upper ports of the cylinder respectively.

In the arrangement shown in Figures 2 and 3, the driving crank 7 is in the shape of a drum journalled by means of pad bearings 8 on a mandrel 9, and it carries gear teeth 3. The mandrel 9 is fixed to the crank casing 10 by means of screws 11. The valve crank 12 is journalled on the inside of the mandrel 9 by means of pad bearings 13. The crank pin 14 of the valve crank 12 has a spherical socket to embrace a ring 15 having a male spherical bearing surface. The ring 15 is arranged to slide on the pin 5 of the valve 4.

Referring to Figure 3 the driving crank 7 of Figure 2 is shown in the position in which the scavenge ports are just closed. From the outer dead centre the crank has rotated through the angle α, while the valve crank 14 has been constrained to traverse the larger angle β. The circles described by the pins of the driving crank and the valve crank, are designated a and b respectively. It may be seen that in the position of the figure about 45% of the valve travel has already been utilised, while in the usual case with the valve coupled direct to a uniformly moving crank pin, barely 25% of its total travel would have been utilised. The remaining references correspond to those of Figures 1 and 2. The pivot point of the driving crank is designated $O_1$, that of the valve crank $O_2$. Of course the sliding shoe 16 must also rotate about its own axis $O_3$.

Instead of being mounted on the projection 14, the sliding shoe 16 may be fitted to a pin mounted for example at the other end of the crank 12. In this case the pair of guide bars 6 must of course be removed to the other side of the crank 7.

Figure 4:
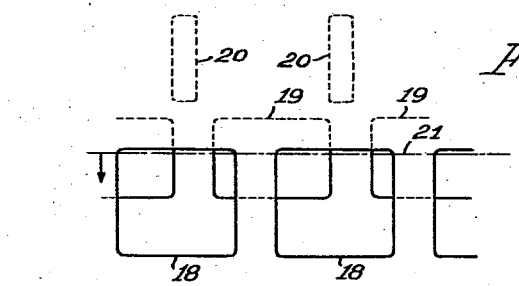

Figures 4 to 6 show the ports of the valve and cylinder wall developed into a flat surface, to indicate their various relative positions. It will be seen that only two kinds of ports are provided in the valve, namely exhaust and scavenge ports, while the cylinder wall has in addition supercharging ports. The two former are controlled by the movement of the valve coaxial with the piston movement, while the last-named are controlled by the valve movement in a direction normal thereto, in combination with the piston movement.

The rectangles 18 shown in full lines are the ports of the valve, the rectangles 19 are the scavenge ports in the cylinder wall, and the rectangles 20 the separate supercharging ports also provided in the cylinder wall, while the chain-dotted line 21 represents the upper edge of the piston. Fig. 4 shows the condition ruling at the commencement of scavenging, when the upper edge 21 of the piston in its outward movement uncovers the upper edge of the valve ports 18, forming a free transfer cross-section between the two edges.

Fig. 5 shows the position at the end of scavenging, when the lower edges of the valve ports 18 in their upward movement leave the upper edges of the ports 19. At the same time the valve ports 18 are moving to the left, and shortly afterwards come into the position shown in Fig. 6 in which supercharging commences. Here the ports 18 have begun to uncover the supercharging ports 20. These ports open more and more, and are finally closed by the upper edge 21 of the rising piston. The small arrows denote the directions of movement of the piston and valve.

The exhaust ports 22 at the upper end of the cylinder are not shown in these diagrams, and are opened and closed by the ports 23 of the valve.

The method of operation of the valve gear in accordance with the invention will be clear from Figure 7. This is a diagram of port openings plotted against main crank angle, and relates to an engine in which the valve travel is 44% of the piston stroke, and the connecting rod 185% of the piston stroke. The principal crank angles are marked on the axis of abscissae, and the positions of interest are marked by ordinates. The curve $x$ represents the position of the upper edge of the piston, the curves $y_1$ and $y_2$ the positions of the lower edges of the valve ports, and the curve $z$ the position of the upper edge of the lower valve ports. The lines $u$ and $v$ denote the upper edges of the exhaust and scavenge ports of the cylinder respectively.

Examination of the diagram will show that on passing the ordinate $c$, the exhaust ports at the upper end of the cylinder commence to open and the combustion products can escape. At the ordinate $d$ the upper edge of the piston commences to uncover the scavenge ports, so that the scavenging air provided by the usual blower can enter the cylinder, and can pass through it to the exhaust ports. After the exhaust ports have been closed at the ordinate $e$ by the rising of the valve, the scavenge blower supplies fresh air to the cylinder through the scavenge ports, which still remain open, so that the cylinder is charged up to the pressure of the scavenging air. At the ordinate $f$ the scavenge ports are closed and the supercharging ports open, admitting the supercharging air. The air required for this purpose is advantageously supplied by a second blower or a compressor, unless other arrangements are made for the purpose. Finally the supercharging ports are closed at the ordinate $g$ by the upper edge of the piston.

I claim:

1. A two-stroke cycle internal combustion engine comprising a cylinder, a piston therein, a sleeve valve between the cylinder and the piston, exhaust and scavenge ports in the cylinder wall and in the valve, and separate supercharging ports in the cylinder wall alone, and means to reciprocate the sleeve valve in the axial direction and to oscillate it about its axis in timed relation with the engine crankshaft, the exhaust and scavenge ports being controlled by the axial movement of the valve, and the supercharging ports by the oscillating movement in combination with the piston movement.

2. A two-stroke cycle internal combustion engine comprising a cylinder, a piston therein, a sleeve valve between the cylinder and the piston, exhaust and scavenge ports in the cylinder wall and in the valve, and separate supercharging ports in the cylinder wall alone, and means to reciprocate the sleeve valve in the axial direction and to oscillate it about its axis in timed relation with the engine crank shaft, in which the scavenge ports remain open after the exhaust ports are closed and until the cylinder is charged substantially to the pressure of the scavenging air, while the supercharging ports in the cylinder are brought into register with the scavenge ports of the valve after the scavenge ports of the cylinder have been closed, and the supercharging ports are closed by the piston when the cylinder has received its supercharge.

3. A two-stroke cycle internal combustion engine comprising a cylinder, a piston therein, a sleeve valve between the cylinder and the piston, exhaust and scavenge ports in the cylinder wall and in the valve, and separate supercharging ports in the cylinder wall alone, a crank freely rotatable in timed relation with the engine crank shaft linked to the sleeve valve to impart to the sleeve valve a combined oscillating and reciprocating motion, a second crank connected to the first through a sliding member and guides and having a different throw, and means to rotate the second crank about a pivot point arranged eccentrically to the first crank, and so located that in the neighborhood of the outer dead centre of the sleeve valve the angular velocity of the first crank will be higher than that of the second crank, the exhaust and scavenge ports of the engine being controlled by the axial movement of the sleeve valve, and the supercharging ports by the oscillatory movement in combination with the piston movement.

4. A two-stroke cycle internal combustion engine comprising a cylinder, a piston therein, a sleeve valve between the cylinder and the piston, exhaust and scavenge ports in the cylinder wall and in the valve, and separate supercharging ports in the cylinder wall alone, a crank freely rotatable in timed relation with the engine crank shaft in the form of a disc with peripheral bearing connected to the sleeve valve by means of an eccentrically located ball and socket joint which imparts to the sleeve valve a combined oscillating and reciprocating motion, said disk carrying a sliding shoe likewise eccentrically located, a second crank with a different throw from that of the first crank, arranged eccentrically to the latter and connected to it through guides which cooperate with the sliding shoe, and means for rotating the second crank, the exhaust and scavenge ports of the engine being controlled by the axial movement of the sleeve valve, and the supercharging ports by the oscillating movement in combination with the piston movement.

5. A two-stroke cycle internal combustion engine comprising a cylinder, a piston therein, a sleeve valve between the cylinder and the piston, exhaust and scavenge ports in the cylinder wall and in the valve, and separate supercharging ports in the cylinder wall alone, a crank freely rotatable to impart a combined oscillating and reciprocating motion thereto linked to the sleeve valve, a second crank having a different throw from that of the first crank and being in the form of a drum eccentrically journalled around the first crank, a sliding member and guides cooperating with said member to connect the two cranks, and means to rotate the second crank about an axis which is eccentrical to that of the first crank, the exhaust and scavenge ports of the engine being controlled by the axial movement of the sleeve valve, and the supercharging ports by the oscillating movement in combination with the piston movement.

GEORGE STEPHEN KAMMER.